(12) United States Patent
Hashimoto et al.

(10) Patent No.: US 7,929,244 B2
(45) Date of Patent: Apr. 19, 2011

(54) MAGNETIC TAPE RECORDING/REPRODUCING APPARATUS

(75) Inventors: Katsuhiro Hashimoto, Kanagawa (JP); Keisuke Horii, Kanagawa (JP); Shinji Muta, Kanagawa (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 791 days.

(21) Appl. No.: 11/749,247

(22) Filed: May 16, 2007

(65) Prior Publication Data

US 2007/0279798 A1  Dec. 6, 2007

(30) Foreign Application Priority Data

May 31, 2006  (JP) ................................. 2006-151942

(51) Int. Cl.
*G11B 15/68* (2006.01)
*G11B 17/00* (2006.01)
(52) U.S. Cl. .......................................... 360/94; 360/95
(58) Field of Classification Search .................... 360/92, 360/92.1, 95, 94
See application file for complete search history.

(56) References Cited

U.S. PATENT DOCUMENTS

2006/0066987 A1* 3/2006 Tamura et al. ................... 360/85
2006/0066989 A1* 3/2006 Annen et al. .................... 360/85

FOREIGN PATENT DOCUMENTS

JP  2006/107540  4/2006
JP  2006107540 A  * 4/2006

* cited by examiner

*Primary Examiner* — Brian E Miller
*Assistant Examiner* — Adam B Dravininkas
(74) *Attorney, Agent, or Firm* — Ladas & Parry LLP

(57) ABSTRACT

A magnetic tape recording/reproducing apparatus is disclosed that selectively loads a first tape cassette accommodating a first magnetic tape or a second tape cassette accommodating a second magnetic tape having a width greater than the width of the first tape. The apparatus includes a rotating drum unit including a lower stationary drum and an upper rotating drum, and a loading mechanism that, if the first tape cassette is loaded, pulls the first magnetic tape out of the first tape cassette and winds it onto the rotating drum unit through a first winding angle so as to form a first tape path and, if the second tape cassette is loaded, pulls the second magnetic tape out of the second tape cassette and winds it onto the rotating drum unit through a second winding angle greater than the first winding angle so as to form a second tape path.

3 Claims, 13 Drawing Sheets

$\beta < \theta$
$\gamma < \theta$ $$\varepsilon > \theta$$

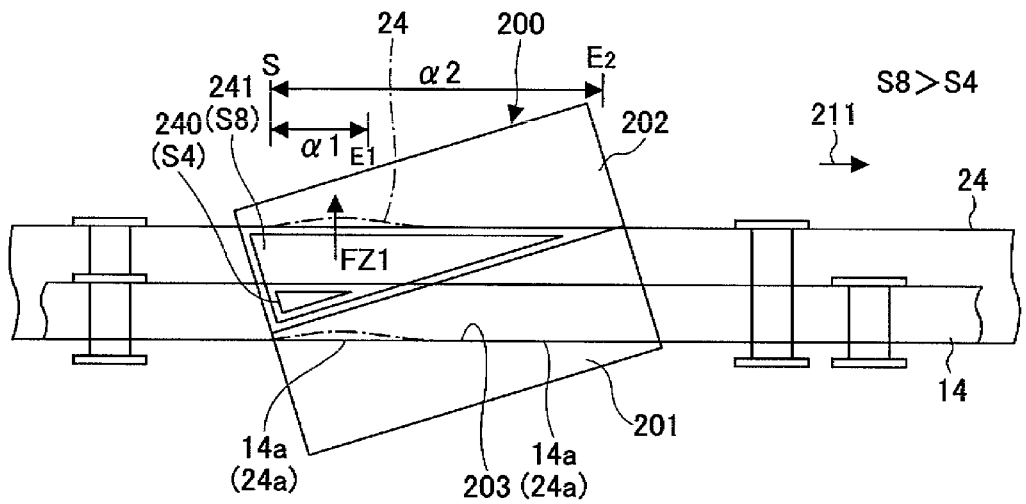

MAGNETIC TAPE RECORDING/REPRODUCING APPARATUS

BACKGROUND OF THE INVENTION

1. Field of the Invention

The present invention generally relates to a magnetic tape recording/reproducing apparatus, and particularly relates to a magnetic tape recording/reproducing apparatus that is used as an external storage device for a computer with use of a tape cassette, the magnetic tape recording/reproducing apparatus including a rotating drum and a tape loading mechanism and being capable of selectively loading a first tape cassette that accommodates a first magnetic tape having a first width W1 or a second tape cassette that accommodates a second magnetic tape having a second width W2 (e.g., twice the first width W1).

2. Description of the Related Art

Among streamer devices used as external storage devices for computers, those using tape cassettes and including rotating drums and tape loading mechanisms like video tape recorders have been commercialized.

Existing streamer devices have storage capacities as high as 72 GB in compression mode, for example. Yet, there is a market demand for streamer devices with larger storage capacities. In order to meet this demand, various manufacturers are developing new techniques for improving the streamer devices.

As one way of increasing the storage capacities of the streamer devices, a new tape cassette that accommodates a magnetic tape having a tape width greater than the tape widths of magnetic tapes accommodated in existing tape cassettes may be used.

Considering the fact that the existing streamer devices are still in use and that there are many existing tape cassettes in which information is recorded by the existing streamer devices, a new streamer device capable of using the new tape cassette needs to be compatible with the existing streamer devices, be capable of using the existing tape cassettes, and be capable of accurately reproducing information in the existing tape cassettes recorded by the existing streamer devices. The applicant of the present invention has developed a streamer device that meets the above demands. This streamer device is disclosed in Japanese Patent Laid-Open Publication No. 2006-107540.

This streamer device comprises a tape cassette loading mechanism, a rotating drum unit 200 (FIGS. 11A and 11B), and a tape loading mechanism. The tape cassette loading mechanism is configured to selectively load either a first tape cassette 10 that accommodates a first magnetic tape (hereinafter referred to as a 4 mm tape) 14 having a width W1 of 4 mm or a second tape cassette 20 that accommodates a second magnetic tape (hereinafter referred to as an 8 mm tape) 24 having a width W2 of 8 mm (see FIG. 2).

Referring to FIGS. 11A and 11B, the rotating drum unit 200 comprises a lower stationary drum 201 and an upper rotating drum 202. A lead 203 is provided on the peripheral surface of the stationary drum 201. The rotating drum 202 includes a rotating head (not shown). The rotating drum 202 rotates in the direction indicated by the arrow 205, i.e., in the counterclockwise direction when viewed from above. As shown exploded in FIG. 11C, the lead 203 has a simple spiral shape, extends about 180 degrees around the stationary drum 201 of the rotating drum unit 200, and has a lead angle of θ. The lead angle indicates the inclination angle of the lead 203 with respect to a rotation plane of the rotating head (a plane orthogonal to the center axis of the rotating drum unit 200).

If the 4 mm tape cassette 10 is loaded, the tape loading mechanism pulls out the 4 mm tape 14 from the 4 mm tape cassette 10 and, as shown in FIGS. 11A and 11B, winds the 4 mm tape 14 diagonally around the rotating drum unit 200 through an angle α1 (about 90 degrees) from a position S to a position E1 along the lead 203 so as to form a first tape path 210.

If the 8 mm tape cassette 20 is loaded, the tape loading mechanism pulls out the 8 mm tape 24 from the 8 mm tape cassette 20 and, as shown in FIGS. 12A and 12B, winds the 8 mm tape 24 diagonally around the rotating drum unit 200 through an angle α2 (about 180 degrees) from a position S to a position E2 along the lead 203 to form a second tape path 220. The position S from which the 4 mm tape 14 is wound onto the rotating drum unit 200 is the same as the position S from which the 8 mm tape 24 is wound onto the rotating drum unit 200.

In FIG. 13A, the 4 mm tape 14 wound on the rotating drum unit 200 and the 8 mm tape 24 wound on the rotating drum unit 200 are shown superposed. The 4 mm tape 14 and the 8 mm tape 24 are guided by the lead 203 by being in contact therewith at a lower edge 14a and a lower edge 24a, respectively. The lower edge 14a and the lower edge 24a are located in the same position.

When the 4 mm tape 14 runs on the peripheral surface of the rotating drum unit 200 in the direction indicated by the arrow 211, as shown in FIG. 13B, the rotating head scans the 4 mm tape 14 as indicated by the arrow 220 so as to form tracks 230 in tight contact with each other having inclination angles (hereinafter referred to also as track inclination angles) θ with respect to the longitudinal axis of the 4 mm tape 14, in which information is recorded. FIGS. 13B and 13C show the opposite sides of the magnetic film surfaces of the 4 mm tape 14 and the 8 mm tape 24. Strictly speaking, the inclination angles θ of the tracks 230 are different from the lead angle θ of the lead 203 due to running movement of the 4 mm tape 14. However, since the difference is very small, the track inclination angles θ of the tracks 230 are considered equal to the lead angle θ of the lead 203 for ease of explanation in this document.

When the 8 mm tape 24 runs on the peripheral surface of the rotating drum unit 200 in the direction indicated by the arrow 211, as shown in FIG. 13C, the rotating head scans the 8 mm tape 24 as indicated by the arrow 220 so as to form tracks 231 in tight contact with each other having inclination angles θ with respect to the longitudinal axis of the 8 mm tape 24, in which information is recorded.

It is to be noted that since the width of a recording track formed in a tape is made small for the purpose of increasing storage capacity, the allowable deviation of the trajectory of the rotating head from the recording track on the tape during reading operation is small.

<Patent Document 1> Japanese Patent Laid-Open Publication No. 2006-107540

The inventors of the present invention have found from a study on the behavior of the above-described streamer device that the state of contact of the lower edge 14a of the 4 mm tape 14 running on the peripheral surface of the rotating drum unit 200 in the direction indicated by the arrow 211 with the lead 203 is different from the state of contact of the lower edge 24a of the 8 mm tape 24 running on the peripheral surface of the rotating drum unit 200 in the direction indicated by the arrow 211.

Referring to FIG. 13A, a region 240 where the 4 mm tape 14 is in contact with the rotating drum 202 has an area of S4. A region 241 where the 8 mm tape 24 is in contact with the rotating drum 202 has an area of S8. The area S8 is not equal to the area S4. More specifically, the area S8 is greater than the area S4 (S8>S4).

In relation to the rotational direction of the rotating drum 202, both the 4 mm tape 14 and the 8 mm tape 24 are subjected to a force FZ1 that causes upward displacement of the 4 mm tape 14 and the 8 mm tape 24 at the starting side of winding on the rotating drum unit 200 due to contact with the rotating drum 202.

The upward displacement force FZ1 applied to the 8 mm tape 24 is greater than the upward displacement force FZ1 applied to the 4 mm tape 14 because of the relationship of S8>S4.

Accordingly, the 8 mm tape 24 wound on the rotating drum unit 200 is displaced upward at the starting side of winding on the rotating drum unit 200 as indicated by the one-dot chain line, which may result in forming a track 231a of a track inclination angle θ1 that is greater than the track inclination angle θ of the appropriate track 231 (θ1>θ).

Depending on the magnitude of the angle difference, the chance of errors occurring during reproduction of the 8 mm tape 24 that is properly recorded by other streamer devices may be increased.

SUMMARY OF THE INVENTION

In view of the foregoing, the present invention is directed to providing a magnetic tape recording/reproducing apparatus that solves one or more of the problems discussed above.

According to an aspect of the present invention, there is provided a magnetic tape recording/reproducing apparatus that selectively loads a first tape cassette accommodating a first magnetic tape or a second tape cassette accommodating a second magnetic tape having a width greater than the width of the first tape. The magnetic tape recording/reproducing apparatus comprises: a rotating drum unit that includes a lower stationary drum on whose peripheral surface a lead is formed and an upper rotating drum including a rotating head; and a loading mechanism that, if the first tape cassette is loaded, pulls the first magnetic tape out of the first tape cassette and winds the first magnetic tape onto the rotating drum unit through a first winding angle so as to form a first tape path and, if the second tape cassette is loaded, pulls the second magnetic tape out of the second tape cassette and winds the second magnetic tape onto the rotating drum unit through a second winding angle greater than the first winding angle so as to form a second tape path. The lead formed on the peripheral surface of the stationary drum of the rotating drum unit includes a first lead portion extending through the first winding angle and a second lead portion following the first lead portion and extending through the second winding angle excluding the first winding angle. A lead angle of the second lead portion is different from a lead angle of the first lead portion.

In the above-described magnetic tape recording/reproducing apparatus, the angle of the second magnetic tape wound on the peripheral surface of the rotating drum unit with respect to a rotation plane of the rotating head (a plane orthogonal to the center axis of the rotating drum unit) is slightly different from the angle of the first magnetic tape wound on the peripheral surface of the rotating drum unit with respect to the rotation plane of the rotating head.

The path of the second magnetic tape wound on the peripheral surface of the rotating drum unit is slightly displaced when a recording/reproduction operation is performed with rotation of the rotating drum and movement of the second magnetic tape. As the slight angle difference corresponds to the slight displacement of the path of the second magnetic tape wound on the peripheral surface of the rotating drum unit, the magnetic tape recording/reproducing apparatus can form tracks in the second magnetic tape having greater width with higher accuracy compared with the related art magnetic tape recording/reproducing apparatus. This also improves compatibility between magnetic tape recording/reproducing apparatuses.

BRIEF DESCRIPTION OF THE DRAWINGS

FIGS. 13A through 13D are diagrams for illustrating track patterns formed in a 4 mm tape and an 8 mm tape and displacement of the track pattern of the 8 mm tape.

DETAILED DESCRIPTION OF THE PREFERRED EMBODIMENT

The following describes preferred embodiments of the present invention.

Embodiment 1

Figure 2:
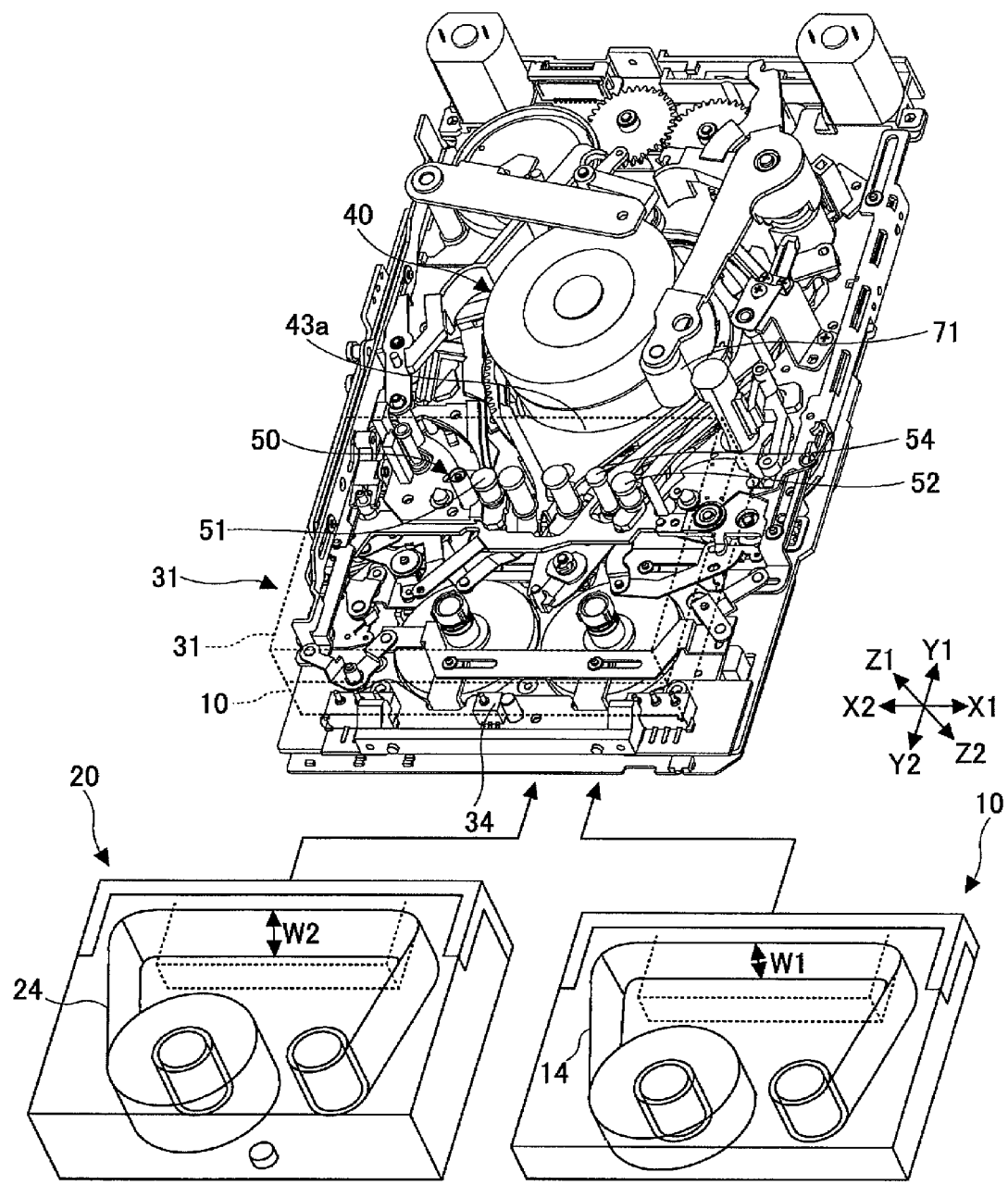
FIG. 2 is a perspective view showing the streamer device of Embodiment 1 of the present invention together with cassettes.

FIG. 2 shows a streamer device 30 according to Embodiment 1 of the present invention. The line X1-X2 represents the width direction; the line Y1-Y2 represents the depth direction; and the line Z1-Z2 represents the height direction.

The streamer device 30 comprises a tape cassette loading mechanism 31, a rotating drum unit 40, and a tape loading mechanism 50.

The tape cassette loading mechanism 31 selectively loads the 4 mm tape cassette 10 that accommodates the 4 mm tape 14 or the 8 mm tape cassette 20 that accommodates the 8 mm tape 24.

Figure 1A:
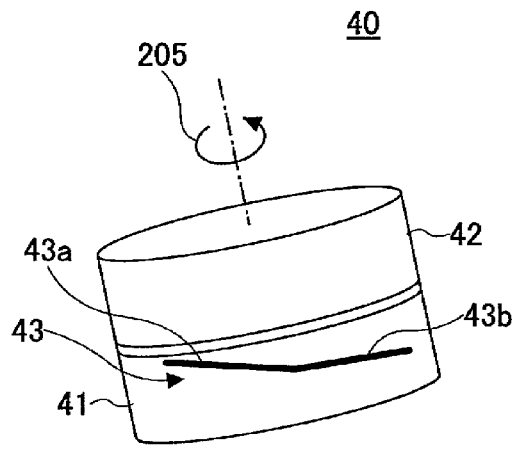
FIGS. 1A and 1B are diagrams each showing a rotating drum unit provided in a streamer device according to Embodiment 1 of the present invention.

As shown in FIG. 1A, the rotating drum unit 40 comprises a lower stationary drum 41 and an upper rotating drum 42. A lead 43 is provided on the peripheral surface of the stationary drum 41. The rotating drum 42 includes a rotating head (not shown). The rotating drum 42 rotates in the direction indicated by the arrow 205, i.e., in the counterclockwise direction when viewed from above.

Figure 1B:
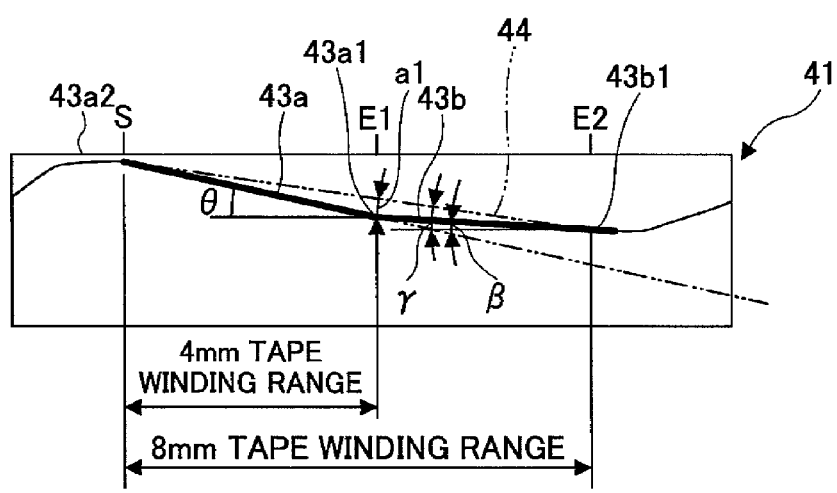

The lead 43 extends through 180 degrees or greater and includes, as shown exploded in FIG. 1B, a first lead portion 43a extending through about 90 degrees upstream in the tape running direction and a second lead portion 43b extending from a terminal end 43a1 of the first lead portion 43a. That is, the first lead portion 43a extends through a first winding angle α1 (described below) and the second lead portion 43b extends through a second winding angle α2 (described below) excluding the first winding angle α1.

An inclination angle of the first lead portion 43a with respect to a plane orthogonal to the center axis of the rotating drum unit 40 (i.e. a rotation plane of the rotating head) is an angle θ, which corresponds to the above-described inclination angles θ of the tracks 230 and 231. An inclination angle of the second lead portion 43b with respect to the plane orthogonal to the center axis of the rotating drum unit 40 is an angle β, which is slightly less than the angle θ (β<θ). The lead 43 is a line deviated in the Z2 direction at the center with respect to a geometric spiral line 44 represented by the two-dot chain line connecting the opposing ends of the lead 43. A distance α1 of the deviation is in a range as small as 0.5 through 3.0 μm, for example.

Figure 4A:
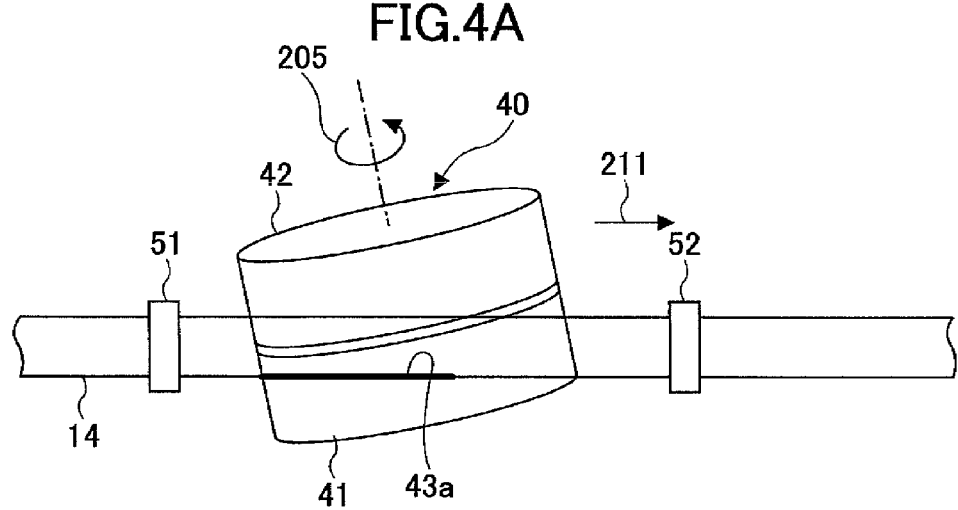
FIGS. 4A through 4C are diagrams each showing a 4 mm tape wound on a rotating drum unit and guided by a lead.
Figure 4B:
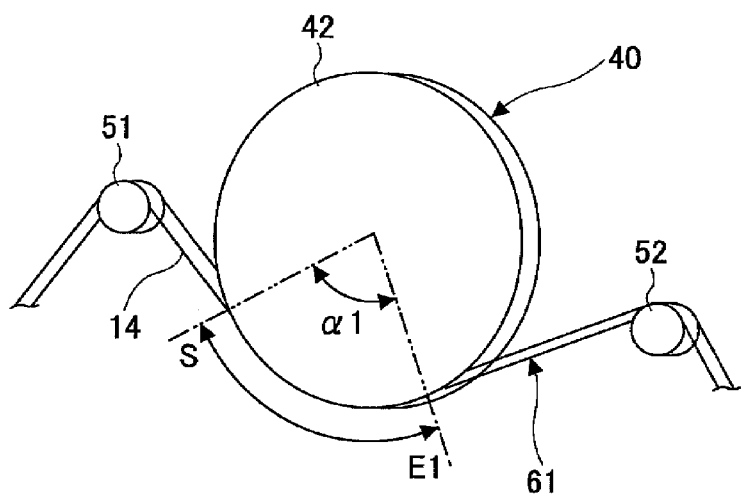
Figure 4C:
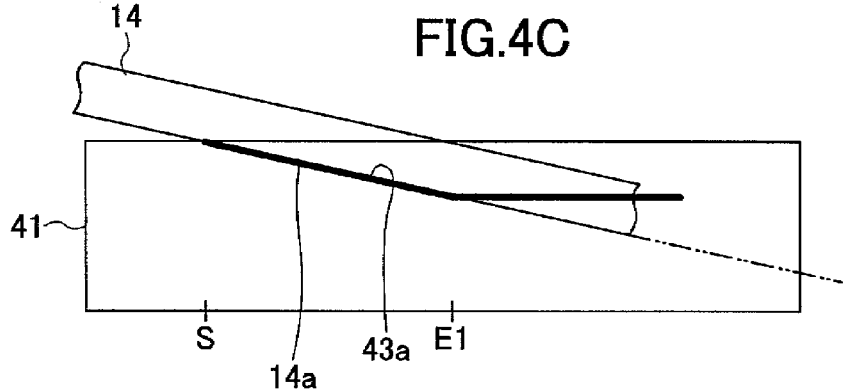

The first lead portion 43a guides the lower edge 14a of the 4 mm tape 14 (see FIG. 4C). A beginning 43a2 of the first lead portion 43a and a terminal end 43b1 of the second lead portion 43b guide the lower edge 24a of the 8 mm tape 24 (see FIG. 6C). The beginning 43a2 and the terminal end 43b1 are spaced apart by about 180 degrees in the rotating direction of the rotating drum unit 40. The line 44 passes the beginning 43a2 of the first lead portion 43a and the terminal end 43b1 of the second lead portion 43b. An inclination angle γ of the line 44 with respect to the rotation plane of the rotating head is slightly less than the angle θ (γ<θ).

<Operations Performed when Loading the 4 mm Tape Cassette 10>

Figure 3:
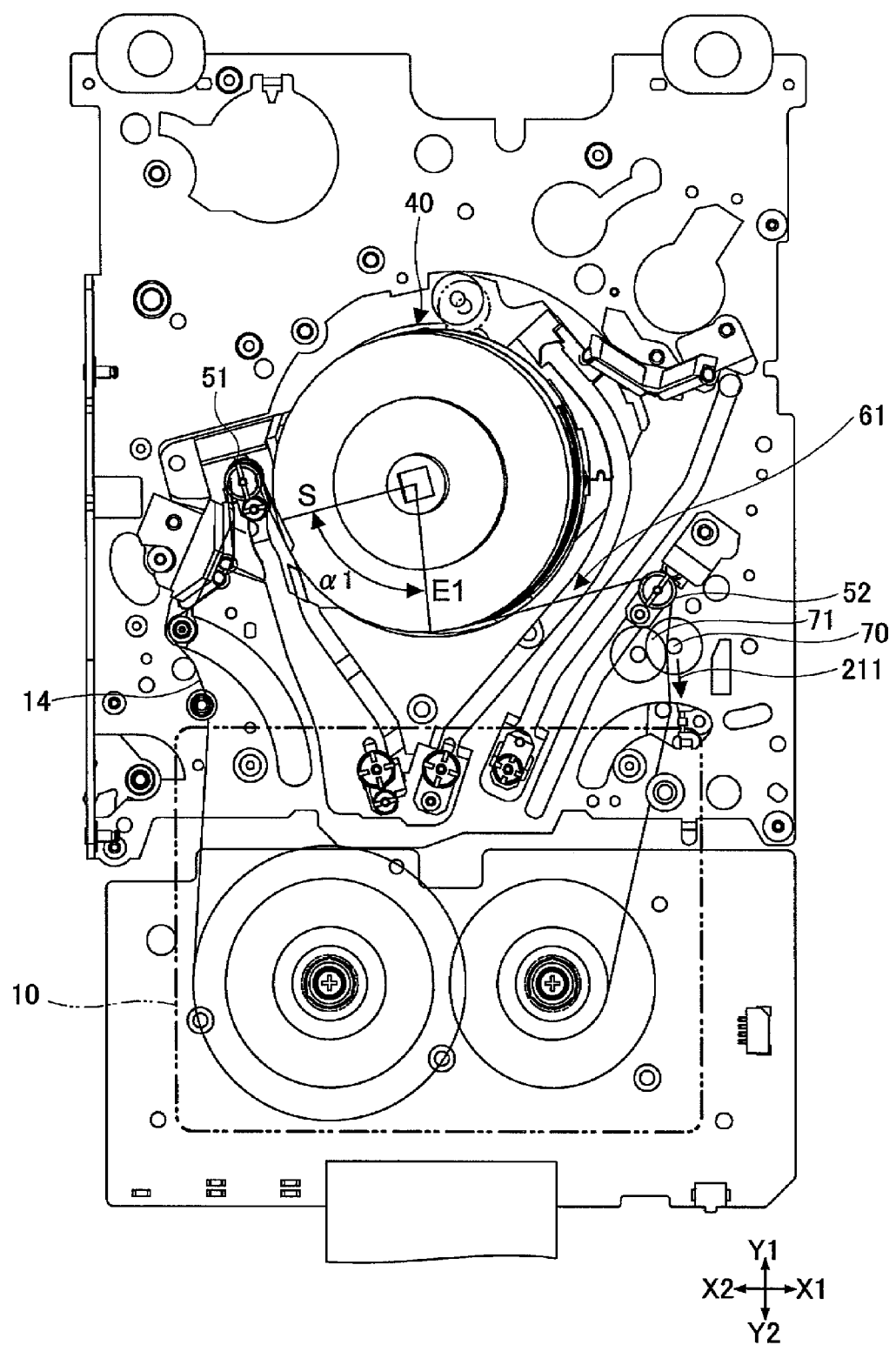
FIG. 3 is a diagram showing a 4 mm tape after completion of tape loading.

With reference to FIG. 3, when the 4 mm tape cassette 10 is loaded, the tape loading mechanism 50 pulls out the 4 mm tape 14 from the 4 mm tape cassette 10 and winds the 4 mm tape 14 diagonally around the rotating drum unit 40 through about 90 degrees between a pole 51 and a pole 52 so as to form a first tape path 61. The 4 mm tape 14 is driven by a capstan 70 and a pinch roller 71 to run in the direction indicated by the arrow 211. Rotation of the rotating drum 42 causes the rotating head to scan the 4 mm tape 14 so as to form a track, in which information is recorded.

FIGS. 4A through 4C show the 4 mm tape 14 wound on the rotating drum unit 40. The 4 mm tape 14 is wound diagonally around the rotating drum unit 40 through the angle α1 (about 90 degrees) from a position S to a position E1 between the pole 51 at the entrance side of the rotating drum unit 40 and the pole 52 at the exit side of the rotating drum unit 40 and is in contact at the lower edge 14a with the first lead portion 43a.

Figure 7A:
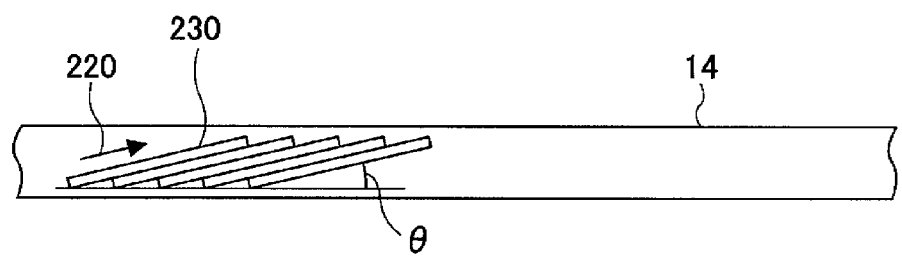
FIGS. 7A and 7B are diagrams showing a track pattern formed in a 4 mm tape and a track pattern formed in an 8 mm tape, respectively.
Figure 7B:
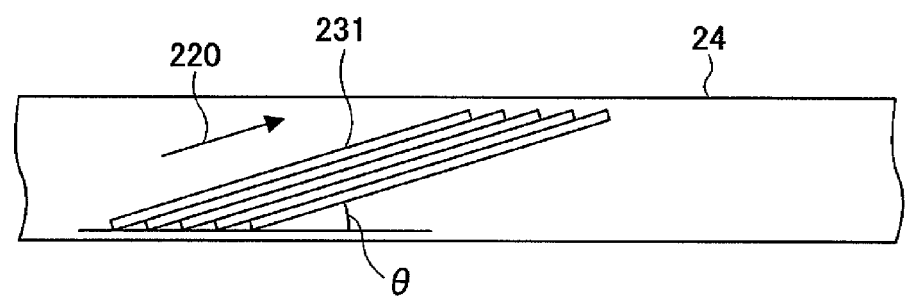

On the peripheral surface of the rotating drum unit 40, the 4 mm tape 14 runs in the direction of the arrow 211 while being guided at the lower edge 14a by the first lead portion 43a. The rotating head in motion scans the 4 mm tape 14 in the direction of the arrow 220 as shown in FIG. 7A. Thus, tracks 230 having track inclination angles θ are formed in tight contact with each other, in which information is recorded. FIGS. 7A and 7B show the opposite sides of magnetic film surfaces of the 4 mm tape 14 and the 8 mm tape 24.

<Operations Performed when Loading the 8 mm Tape Cassette 20>

Figure 5:
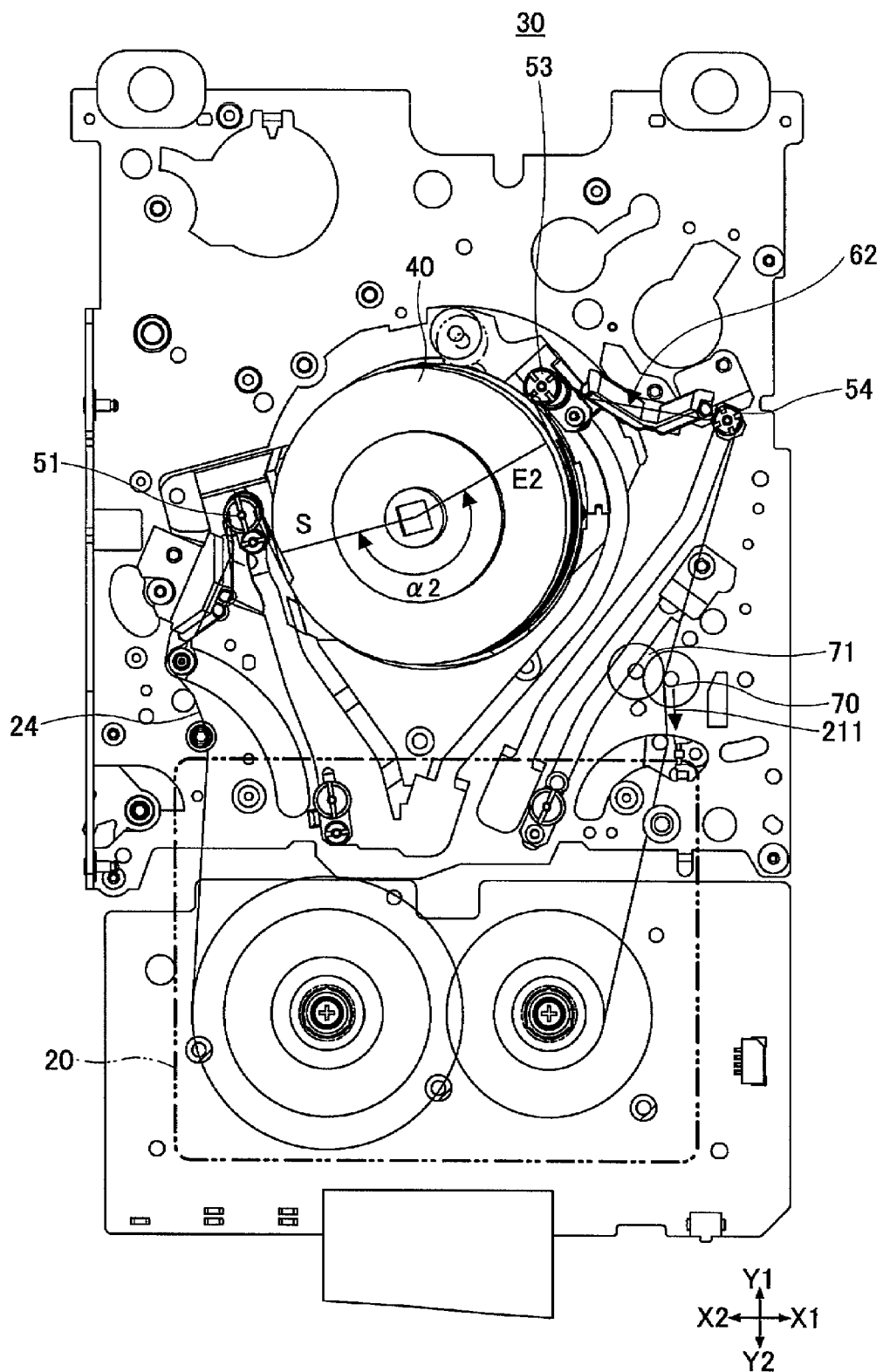
FIG. 5 is a diagram showing an 8 mm tape after completion of tape loading.

With reference to FIG. 5, when the 8 mm tape cassette 20 is loaded, the tape loading mechanism 50 pulls out the 8 mm tape 24 from the 8 mm tape cassette 20 and winds the 8 mm tape 24 diagonally around the rotating drum unit 40 through about 180 degrees between the pole 51 and the pole 53 so as to form a second tape path 62. After being guided by a pole 54, the 8 mm tape 24 reaches the capstan 70 and is driven by the capstan 70 and the pinch roller 71 to run in the direction of the arrow 211. Rotation of the rotating drum 42 causes the rotating head to scan the 8 mm tape 24 so as to form a track, in which information is recorded.

Figure 6A:
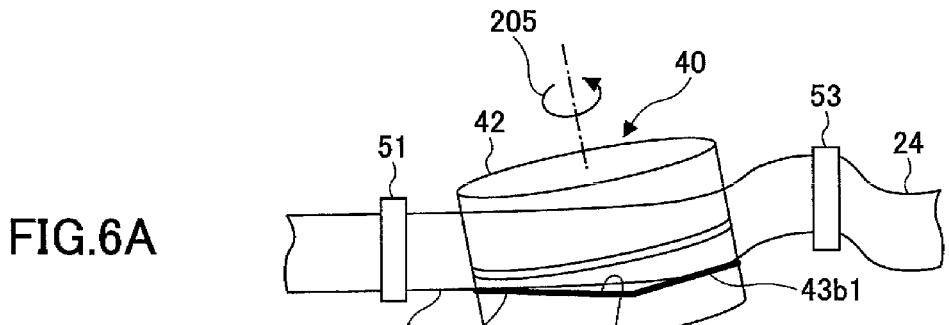
FIGS. 6A through 6D are diagrams each showing an 8 mm tape wound on a rotating drum unit and guided by a lead.
Figure 6B:
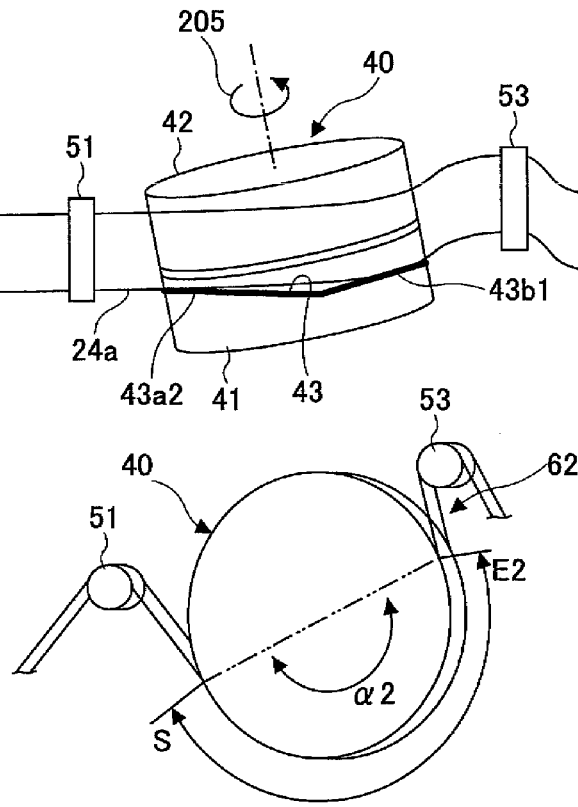
Figure 6C:
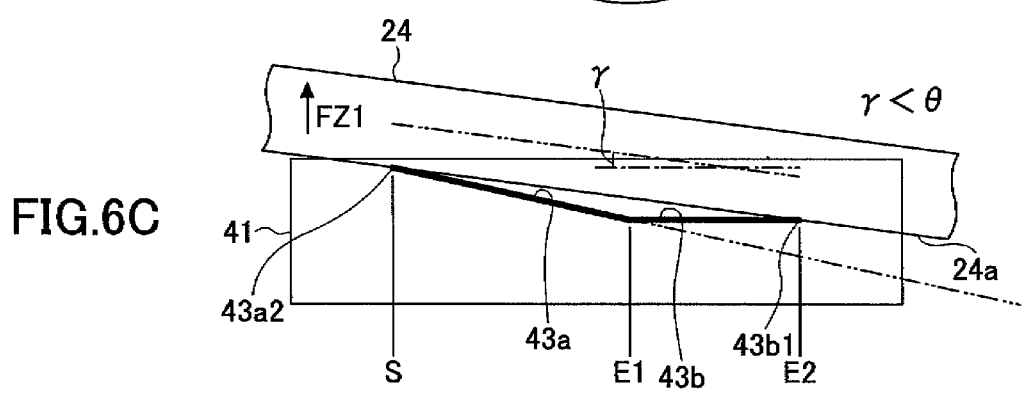

FIGS. 6A through 6C show the 8 mm tape 24 wound on the rotating drum unit 40. The 8 mm tape 24 is wound diagonally around the rotating drum unit 40 through the angle α2 (about 180 degrees) from a position S to a position E2 between the pole 51 at the entrance side of the rotating drum unit 40 and the pole 53 at the exit side of the rotating drum unit 40 and is in contact at the lower edge 24a with the beginning 43a2 of the first lead portion 43a and the terminal end 43b1 of the second lead portion 43b. The position S from which the 8 mm tape 24 is wound onto the rotating drum unit 40 is the same as the position S from which the 4 mm tape 14 is wound onto the rotating drum unit 40. The beginning 43a2 of the first lead portion 43a is located in the position S. The terminal end 43b1 of the second lead portion 43b is located in the position E2. The beginning 43a2 and the terminal end 43b1 are spaced apart from each other by about 180 degrees in the rotating direction of the rotating drum unit 40. The 8 mm tape 24 is guided at two points spaced apart from each other in the longitudinal direction thereof. An inclination angle of the center axis of the 8 mm tape 24 with respect to the rotation plane of the rotating head is γ.

Figure 6D:
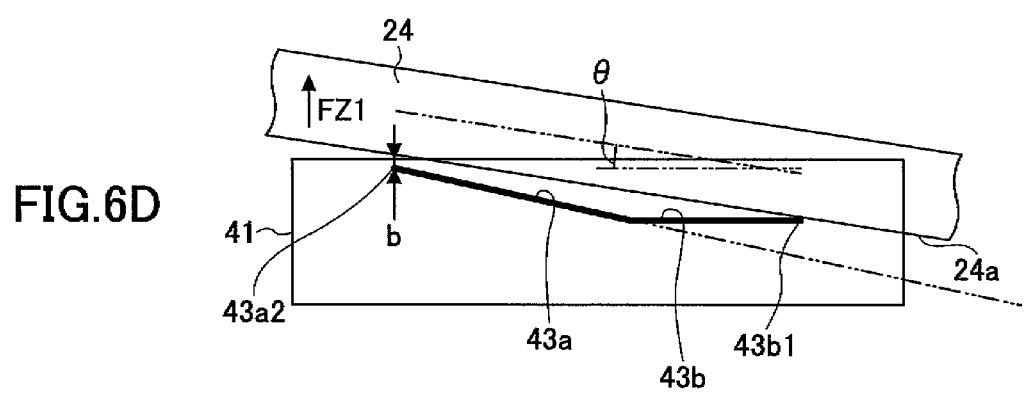

Because the area of the 8 mm tape 24 in contact with the rotating drum 42 is greater, when the rotating drum 42 of the rotating drum unit 40 rotates at high speed in the counterclockwise direction when viewed from above, the 8 mm tape 24 is subjected to a force FZ1 that causes upward displacement of the 8 mm tape 24 at the starting side of winding on the rotating drum unit 40. Thus, as shown in FIG. 6D, the beginning 43a2 of the first lead portion 43a is displaced upward by a slight distance b, so that the 8 mm tape 24 is guided only at the terminal end 43b1 of the second lead portion 43b. The inclination angle of the center axis of the 8 mm tape 24 with respect to the rotation plane of the rotating head is θ, which is slightly greater than γ.

On the peripheral surface of the rotating drum unit 40, the 8 mm tape 24 runs in the direction of the arrow 211 while being guided at the lower edge 24a by the terminal end 43b1 of the second lead portion 43b. The rotating head in motion scans the 8 mm tape 24 in the direction of the arrow 220 as shown in FIG. 7B. Thus, tracks 231 are formed in tight contact with each other in the 8 mm tape 24, in which information is recorded. Inclination angles of the tracks 231 are θ.

With this configuration, a track format is formed in the 8 mm tape 24 with high accuracy.

Since the rotating head scans the 8 mm tape 24 running on the surface of the rotating drum unit 40 at the angle θ with respect to the longitudinal axis thereof, the streamer device 30 can accurately reproduce information in the 8 mm tape 24 properly recorded by another streamer device and therefore reduce the chance of errors compared with the related-art streamer devices.

Embodiment 2

Figure 8A:
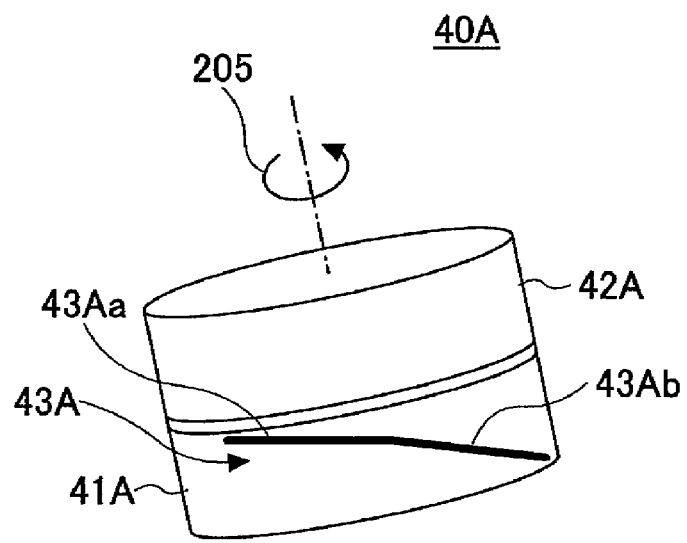
FIGS. 8A and 8B are diagrams each showing a rotating drum unit installed in a streamer device according to Embodiment 2 of the present invention.

FIGS. 8A and B show a rotating drum unit 40A applied to a streamer device according to Embodiment 2 of the present invention. As shown in FIG. 8A, the rotating drum unit 40A comprises a lower stationary drum 41A and an upper rotating drum 42A. A lead 43A is provided on the peripheral surface of the stationary drum 41A. The rotating drum 42A includes a rotating head (not shown). The rotating drum 42A rotates in the direction indicated by the arrow 205, i.e., in the counterclockwise direction when viewed from above.

Figure 8B:
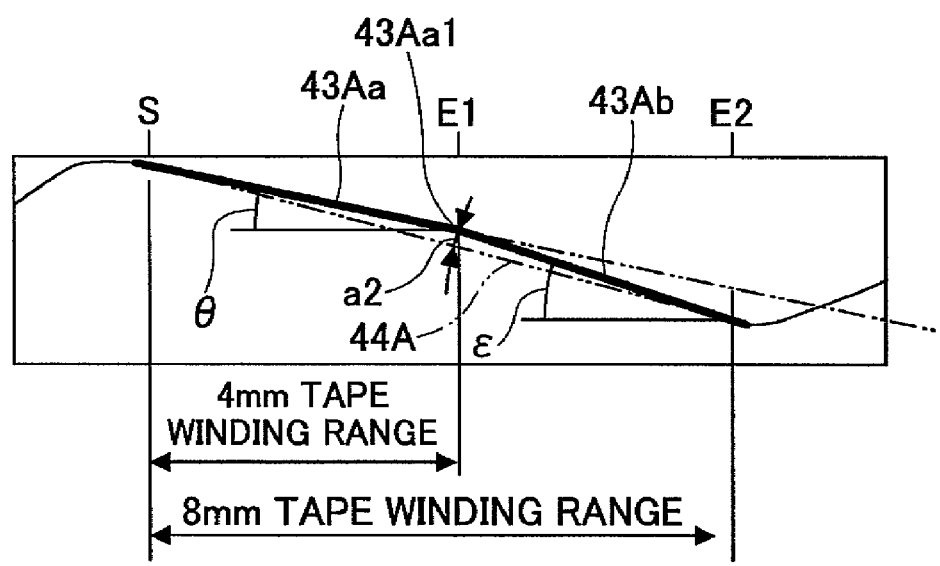

The lead 43A extends through 180 degrees or greater and includes, as shown exploded in FIG. 8B, a first lead portion 43Aa extending through about 90 degrees upstream in the tape running direction and a second lead portion 43Ab extending from a terminal end 43Aa1 of the first lead portion 43Aa through about 90 degrees. That is, the first lead portion 43Aa extends through a first winding angle $\alpha 1$ and the second lead portion 43Ab extends through a second winding angle $\alpha 2$ excluding the first winding angle $\alpha 1$.

An inclination angle of the first lead portion 43Aa with respect to a plane orthogonal to the center axis of the rotating drum unit 40A (i.e. a rotation plane of the rotating head) is an angle $\theta$, which corresponds to the above-described inclination angles $\theta$ of the tracks 230 and 231. The inclination angle of the second lead portion 43Ab with respect to the plane orthogonal to the center axis of the rotating drum unit 40A is an angle $\epsilon$, which is slightly greater than the angle $\theta$ ($\epsilon > \theta$). The lead 43A is a line deviated in the Z1 direction at the center with respect to a geometric spiral line 44A represented by the two-dot chain line connecting the opposing ends of the lead 43A. The distance a2 of the deviation is in a range as small as 0.5 through 3.0 μm, for example.

Figure 9C:
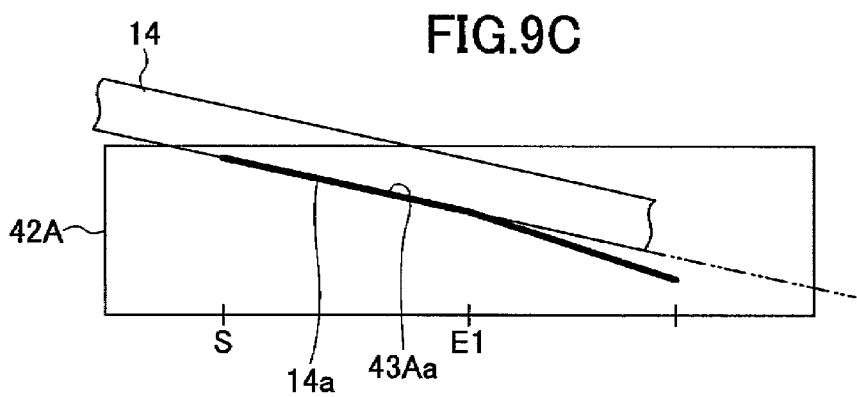
Figure 10A:
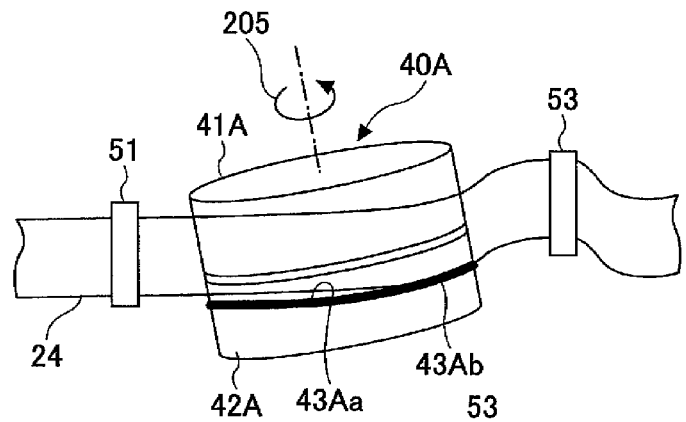
FIGS. 10A through 10D are diagrams each showing an 8 mm tape wound on a rotating drum unit and guided by a lead.
Figure 10B:
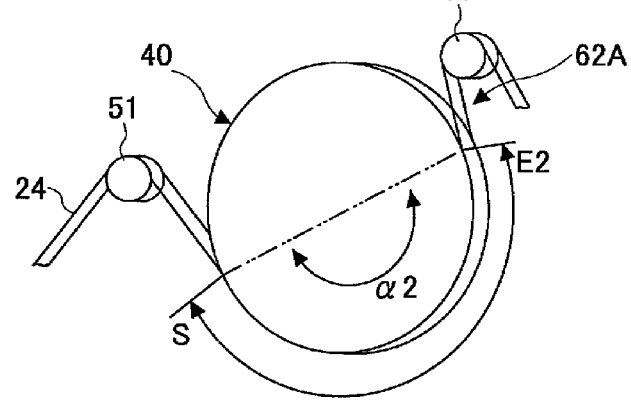
Figure 10C:
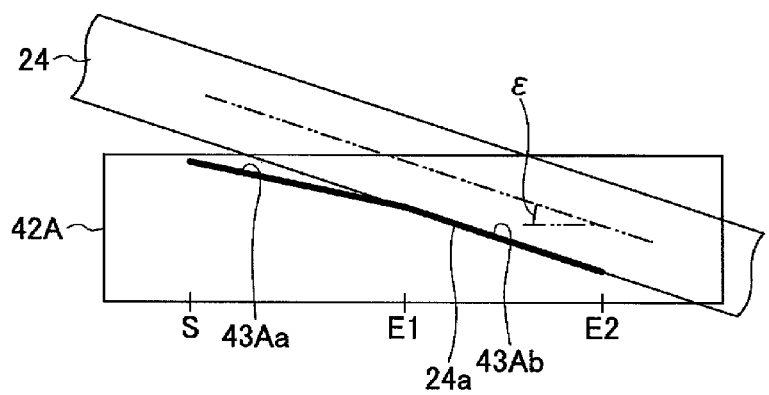
Figure 10D:
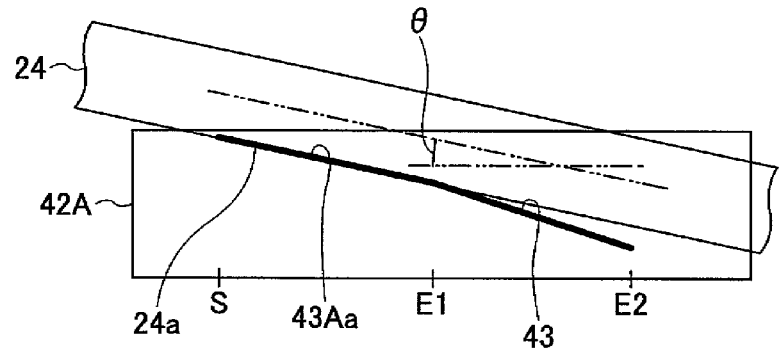
Figure 11A:
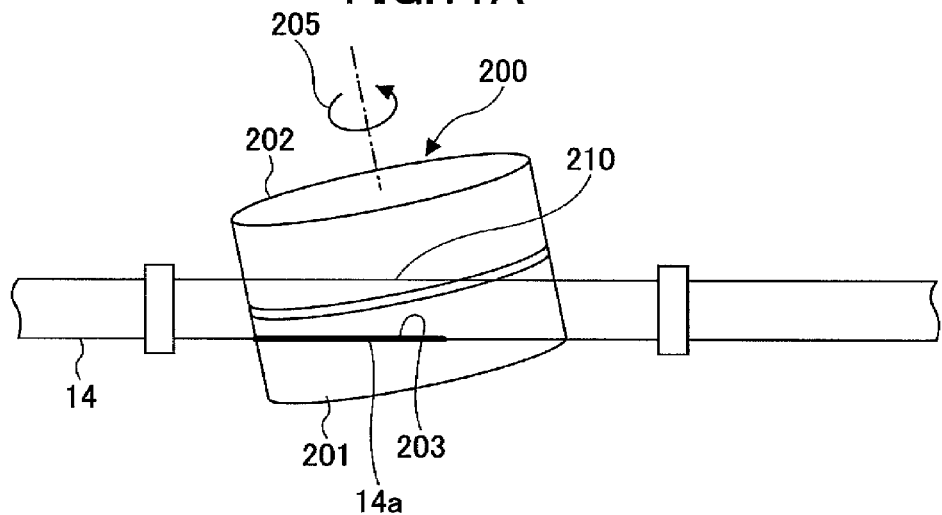
FIGS. 11A through 11C are diagrams each showing a 4 mm tape wound on a rotating drum unit that is installed in a related-art streamer device.
Figure 11B:
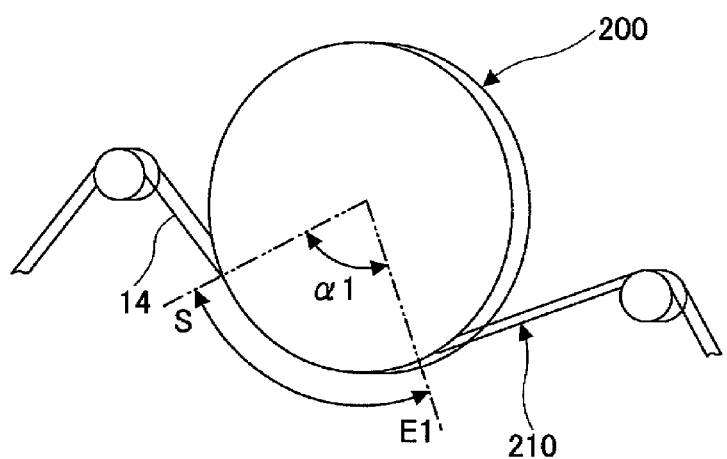
Figure 11C:
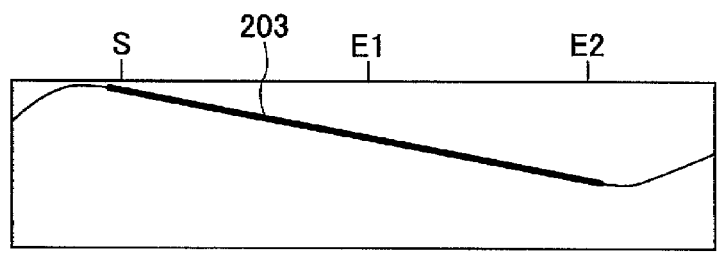
Figure 12A:
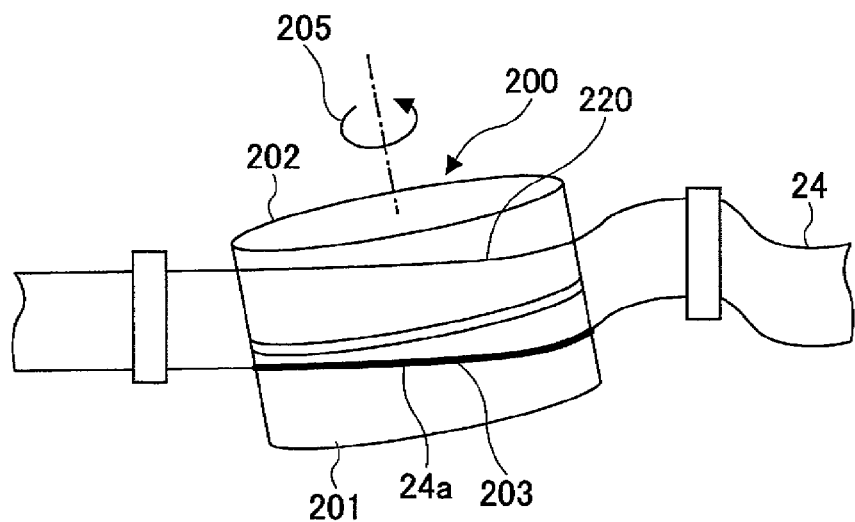
FIGS. 12A and 12B are diagrams showing an 8 mm tape wound on the rotating drum unit of FIGS. 11A and 11B, respectively.
Figure 12B:
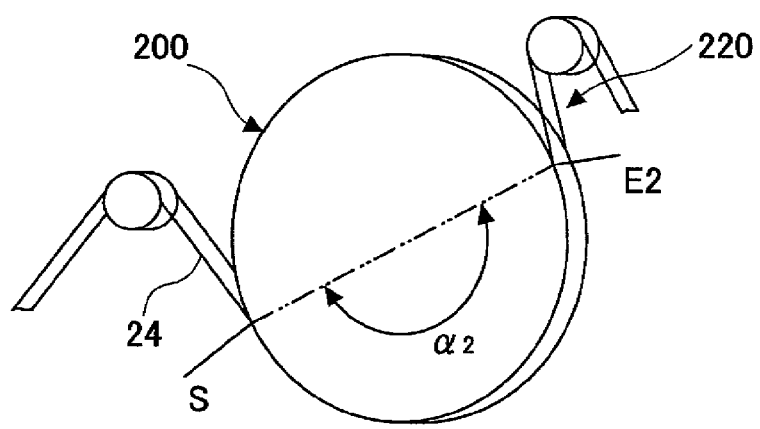

The first lead portion 43Aa guides the lower edge 14a of the 4 mm tape 14 (see FIG. 9C) The first lead portion 43Aa or the second lead portion 43Ab guides the lower edge 24a of the 8 mm tape 24 (see FIGS. 10C and 10D).

For example, depending on the configuration of a machined groove for air venting formed in the upper rotating drum 42A, a force FZ1 in the Z1 direction applied to the 4 mm tape 14 may be greater than a force FZ1 in the Z1 direction applied to the 8 mm tape 24 (a situation contrary to the situation discussed above). The lead 43A is suitable for this type of a streamer device.

<Operations Performed when Loading the 4 mm Tape Cassette 10>

Figure 9A:
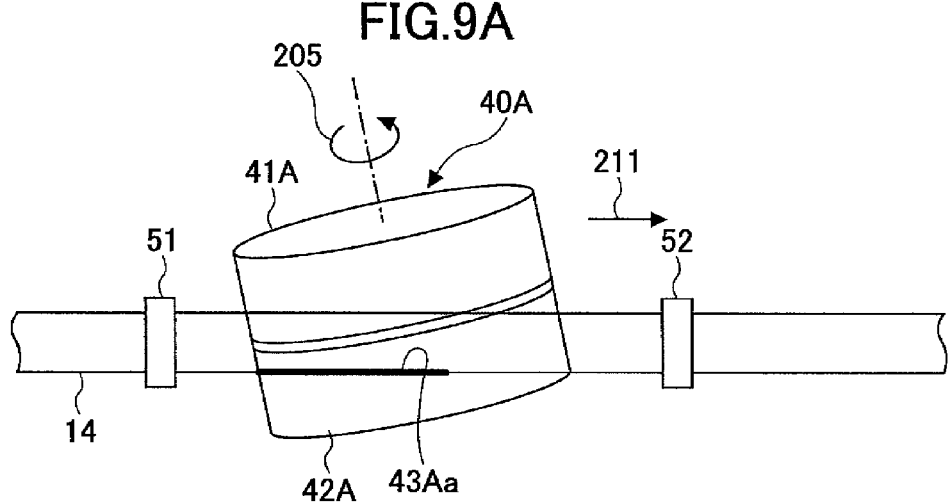
FIGS. 9A through 9C are diagrams each showing a 4 mm tape wound on a rotating drum unit and guided by a lead.
Figure 9B:
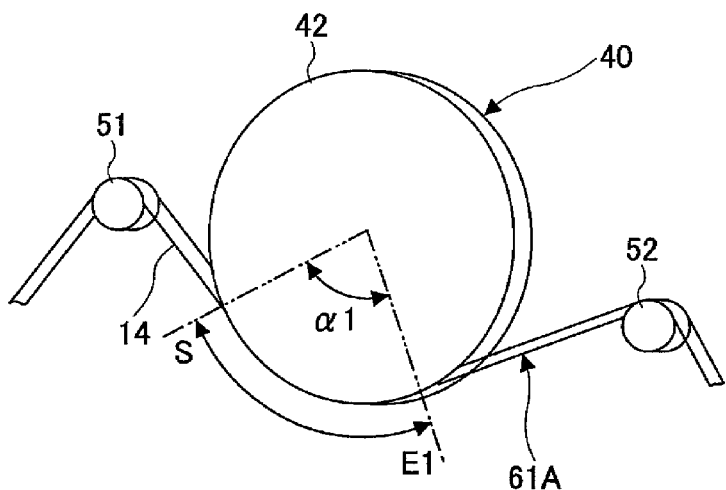

As shown in FIGS. 9A and 9B, the 4 mm tape 14 is wound diagonally around the rotating drum unit 40A through the angle $\alpha 1$ (about 90 degrees) from a position S to a position E1 between a pole 51 and a pole 52 so as to form a first tape path 61. The lower edge 14a of the 4 mm tape 14 is in contact with the first lead portion 43Aa.

The 4 mm tape 14 runs in the direction of the arrow 211 while the lower edge 14a is displaced slightly upward with respect to the first lead portion 43Aa at the starting side of winding onto the rotating drum unit 40A and is guided by the first lead portion 43Aa at the rest of the part. The rotating head in motion scans the 4 mm tape 14 in the direction of the arrow 220 as shown in FIG. 7A. Thus, tracks 230 are formed, in which information is recorded.

<Operations Performed when Loading the 8 mm Tape Cassette 20>

As shown in FIGS. 10A through 10C, the 8 mm tape 24 is wound diagonally around the rotating drum unit 40A through the angle $\alpha 2$ (about 180 degrees) from a position S to a position E2 between the pole 51 and a pole 53 so as to form a second tape path 62A. The lower edge 24a of the 8 mm tape 24 is in contact with the second lead portion 43Ab. An inclination angle of the center axis of the 8 mm tape 24 with respect to the rotation plane of the rotating head is $\epsilon$.

The lower edge 24a is aligned along either the first lead portion 43Aa (see FIG. 10D) or the second lead portion 43Ab (see FIG. 10C) by adjusting the heights of the pole 51 and the pole 53.

With this configuration, a track format is formed in the 8 mm tape 24 with high accuracy.

Since the rotating head scans the 8 mm tape 24 running on the surface of the rotating drum unit 40A at the angle $\theta$ with respect to the longitudinal axis thereof, this streamer device can accurately reproduce information in the 8 mm tape 24 properly recorded by another streamer device and therefore reduce the chance of errors compared with the related-art streamer devices.

The present invention is applicable to recording/reproducing apparatuses using magnetic tapes other than streamer devices.

While the present invention is described in terms of preferred embodiments, it should be apparent to those skilled in the art that variations and modifications may be made without departing from the scope of the invention as set forth in the accompanying claims.

The present application is based on Japanese Priority Application No. 2006-151942 filed on May 31, 2006, with the Japanese Patent Office, the entire contents of which are hereby incorporated by reference.

What is claimed is:

1. A magnetic tape recording/reproducing apparatus that selectively loads a first tape cassette accommodating a first magnetic tape or a second tape cassette accommodating a second magnetic tape having a width greater than a width of the first tape, the magnetic tape recording/reproducing apparatus comprising:
   a rotating drum unit that includes a lower stationary drum on whose peripheral surface a lead is formed and an upper rotating drum including a rotating head; and
   a loading mechanism that, if the first tape cassette is loaded, pulls the first magnetic tape out of the first tape cassette and winds the first magnetic tape onto the rotating drum unit through a first winding angle so as to form a first tape path and, if the second tape cassette is loaded, pulls the second magnetic tape out of the second tape cassette and winds the second magnetic tape onto the rotating drum unit through a second winding angle greater than the first winding angle so as to form a second tape path;
   wherein the lead formed on the peripheral surface of the stationary drum is a single lead having a first lead portion and a second lead portion with different lead angles.

2. The magnetic tape recording/reproducing apparatus as claimed in claim 1,
   wherein the lead angle of the second lead portion is less than the lead angle of the first lead portion; and
   a lower edge of the first magnetic tape is guided by the first lead portion, and a lower edge of the second magnetic tape is guided by a beginning of the first lead portion and a terminal end of the second lead portion.

3. The magnetic tape recording/reproducing apparatus as claimed in claim 1,
   wherein the lead angle of the second lead portion is greater than the lead angle of the first lead portion; and
   a lower edge of the first magnetic tape is guided by the first lead portion, and a lower edge of the second magnetic tape is guided by the second lead portion.

* * * * *